United States Patent
Orlowski et al.

(12) 
(10) Patent No.: US 6,188,840 B1
(45) Date of Patent: Feb. 13, 2001

(54) PROCESS FOR THE MANUFACTURING OF A PRESSURE VESSEL AND A PRESSURE VESSEL, ESPECIALLY FOR A WATER HEATER, MADE BY THE PROCESS

(75) Inventors: Witold Orlowski; Olof Norrlöw, both of Helsingborg (SE)

(73) Assignee: Perstorp AB, Perstorp (SE)

( * ) Notice: Under 35 U.S.C. 154(b), the term of this patent shall be extended for 0 days.

(21) Appl. No.: 09/194,694

(22) PCT Filed: May 20, 1997

(86) PCT No.: PCT/SE97/00817

§ 371 Date: Nov. 30, 1999

§ 102(e) Date: Nov. 30, 1999

(87) PCT Pub. No.: WO97/45250

PCT Pub. Date: Dec. 4, 1997

(30) Foreign Application Priority Data

May 31, 1996 (SE) .................................................. 9602135

(51) Int. Cl.[7] ................. F24H 1/18; B65D 1/24
(52) U.S. Cl. ............................ 392/450; 220/501; 220/507
(58) Field of Search ................... 392/450, 449, 392/451, 452, 453, 441, 443; 220/500, 501, 507, 523, 524, 525

(56) References Cited

U.S. PATENT DOCUMENTS 3,338,238 * 8/1967 Warncke ............................. 220/501

5,704,512 * 1/1998 Falk et al. ............................. 220/501
5,927,537 * 7/1999 Falk et al. ............................. 220/201
5,944,215 * 8/1999 Orlowski ............................. 220/501

FOREIGN PATENT DOCUMENTS

| 3642583 | 6/1987 | (DE) . |
| 4008026 | 9/1991 | (DE) . |
| 0134363 | 3/1985 | (EP) . |
| 460631 | 10/1989 | (SE) . |
| 9313341 | 7/1993 | (WO) . |
| 9313353 | 7/1993 | (WO) . |

* cited by examiner

*Primary Examiner*—Teresa Walberg
*Assistant Examiner*—Thor Campbell
(74) *Attorney, Agent, or Firm*—Stevens, Davis, Miller & Mosher, L.L.P.

(57) ABSTRACT

A process for the manufacturing of a pressure vessel made from a thermoplastic material or a thermosetting resin. The vessel comprises a first and a second vessel end part, and possibly an intermediate tube part. The vessel end parts include a circumfering shell (4) and each one dome (3). A number of partition and load distributing walls (5) stretch from the domes (3) towards the open part of each vessel end part. The possible intermediate tube part includes similar walls (5). The edges of the walls (5) will meet when the different parts are joined. A number of cells (6) are formed between the walls (5). A number of crossing areas are formed between intersecting walls (5). At least one crossing area is provided with a determination by achieving a hole (14) from the outside of the dome. The hole (14) is bigger than the crossing area and has a depth greater than thickness of the dome part (3).

18 Claims, 11 Drawing Sheets

PROCESS FOR THE MANUFACTURING OF A PRESSURE VESSEL AND A PRESSURE VESSEL, ESPECIALLY FOR A WATER HEATER, MADE BY THE PROCESS

The present invention relates to process for the manufacturing of a pressure vessel and a pressure vessel, especially for a water heater, received through the process.

Water heaters in different sizes for both household and industrial purposes normally includes a pressure vessel which without exceptions are made from metal. The heating of the water is achieved by using an electrical heater which normally is constituted by a metal tube containing a heating filament embedded in a mineral or a ceramic material. The heater is guided by a sensor which detects the temperature of the water. The existing pressure of the water supply system is normally used when feeding hot water from the water heater wherein the heater can be placed independently. This is achieved by means of a clack valve which is placed on the cold water inlet of the water heater. This valve will open and replace hot water with cold water as soon as the pressure in the water heater becomes lower as the hot water are drawn from the water heater. The pressure vessel is normally insulated to minimise the energy losses. The temperature range is normally 50–90° C.

One disadvantage with the water heaters of today is that they are manufactured from a metal. It often becomes necessary to provide the pressure vessel with a sacrificial anode to avoid galvanic corrosion since metal is a good conductor. It is possible to use a more noble metal for the pressure vessel to avoid this type of corrosion but that would only move the problem with corrosion to the parts of the water supply system that are made of less noble metals. Metals are also good heat conductors which increases energy losses.

Another disadvantage is caused by the thermal expansion of the water. Most materials expands when the temperature increases, so do most metals, however not enough to compensate for the expansion of the water. This means that the pressure in a water heater completely filled with cold water will increase as the temperature of the water increases. This will cause great stress on the pressure vessel wherein the vessel has to be over-dimensioned in respect to the normal working pressure. This means that the design will be unnecessary heavy and costly.

Yet another disadvantage is the relatively long heating time from completely cold to fully warm water. This problem can of course be rectified by supplying more energy to the water heater. The energy needed to get reasonably short heating times would however be unreasonably lhigh. Such an energy supply would involve a rebuilding of the electrical supply to, for example, a normal household.

Since the heater causes a thermally driven circulation, the temperature of the water in the vessel will be mainly homogenous. The water temperature in the vessel will thereby also decrease mainly homogeneously as cold water are supplied in connection with the use of hot water from the water heater.

Through the present invention the above mentioned disadvantages and inconveniences have been avoided and a pressure vessel for an improved water heater has been achieved. The invention relates to a process for the manufacturing of a pressure vessel made from thermoplastic material or thermosetting resin. The pressure vessel comprises a first and a second vessel end part manufactured through injection moulding or press moulding and possibly an intermediate tube part which preferably is manufactured through extrusion. The vessel end parts include a circumfering shell which form the sides of the pressure vessel and each one dome which form the upper and the lower ends respectively of the pressure vessel when joined. A number of interconnecting and thereby load distributing walls stretch from the domes along the circumfering shell towards the open part of each vessel end part. A corresponding number of matching walls stretch from one open end of the possible intermediate tube part along the circumfering shell of the tube part to the other end of the same so that when two vessel end parts are joined, possibly with an intermediate tube part placed in between, the edges of each of the walls in the different parts meet. A number of cells are hereby formed between the walls. The walls are placed so that a number of crossing areas are formed between intersecting or connecting walls. The invention is characterised in that at least one, preferably all crossing areas are provided with a termination by achieving a hole from the outside of the dome. The hole area is larger than the crossing area and the depth of the hole greater than the goods thickness of the dome part. Communicating openings between the cells in the pressure vessel are hereby prepared.

The possibly intermediate tube parts are preferably manufactured by extrusion. They can however also be manufactured by means of injection moulding possibly assisted by melt core technologies or the like.

The vessel end parts and the possible intermediate tube part are suitably joined by mirror welding, friction welding, pressing or gluing.

The holes are preferably achieved in connection with the manufacturing of the vessel end parts and then by means of peg-like parts placed in one of the halves of a mould. The holes can also be achieved through after-treatment by drilling, milling or the like.

One or more of peg-like parts which is/are placed in one of the mould halves and/or opposite points at the other half of the mould is/are suitably provided with an axially placed long core or cores whose cross-section area are smaller than the cross-section area of the crossing area. At least one channel which is parallel to, and having the full length of the walls are hereby formed in the cross-section of the crossing area.

According to another embodiment of the invention the two halves of the mould are provided with receiving means, placed axially with the peg-like parts. The receiving means are intended to receive a preferably extruded tube. The tube is manufactured of a thermosetting resin or a thermoplastic material. In cases where the tube is manufactured from a thermoplastic material, the melting temperature of the material in the tube should be at least as high as the melting temperature of the material used for the manufacturing of the vessel. The tube is placed in the mould cavity of the mould, after which a fluent plastic material is injected into the mould cavity while the receiving means prevents intrusion of plastic material into the tube through a tight fit between the receiving means and the edges of the tube.

To further prevent the plastic material from entering the tube a gas is suitably injected into the tube simultaneously with the injection of the plastic material. A pressure mainly corresponding to the pressure of the injected fluent plastic material hereby forms within the tube. The tube is hereby also prevented from collapsing under influence of the injection pressure of the plastic material. This will further make use of tubes with very thin walls possible.

As an alternative the tube can be replaced by a so called melt core profile. The two halves of the mould are here provided with receiving means, placed axially with the peg-like parts. The receiving means are intended to receive the melt core profile which is placed into the mould whereupon the fluent plastic material is injected into the mould cavity. The melt core profile is then removed by melting after allowing the plastic material to solidify and removal of the part from the mould. At least one through-hole channel which is parallel to the walls is hereby formed in the cross-section of the crossing area. The mould can as an alternative be provided with means for melting of the melt core profile whereby the profile can be removed while the part is still located in the mould.

According to yet another embodiment of the invention a predetermined amount of fluent plastic material is injected into the mould cavity.

The fluent plastic material is allowed to solidify somewhat, after which a gas is injected into the plastic material through the peg-like parts or the opposite points in the other half of the mould. At least one channel which is parallel to the walls is hereby formed in the cross-section of the crossing area.

The holes are preferably provided with a plug selected from the group consisting of a blind plug, a channel connection plug connected to the channels, a main connection plug connected directly to the pressure vessel or a closing plug adapted to restriction or shut down of the flow through the communicating openings. The plugs are glued, screwed, friction welded, mirror welded or pressed into the holes in the domes. The plugs can be manufactured from metal or plastic material, however the latter is preferred.

According to one embodiment of the invention the two vessel end parts and the possible intermediate tube part are manufactured through injection moulding from two, preferably thermoplastic, compositions. A first predetermined amount of a fluent plastic material A is injected into the mould cavity after which a second remaining amount of a fluent plastic material B is injected so that the plastic material A in the main will enclose the plastic material B.

The plastic material A is suitably a pure, non-filled thermoplastic material selected from polyethylene, polypropylene, polybutene, polyamide, polycarbonate, polyalkyleneterephthalate, polyvinylchloride, polystyrene, cross-linked polyethylene or the like. The plastic material B is one of the above materials, preferably the same as the material A, mixed with 1–35% of a material selected from glass fibre, carbon fibre, steel fibre, mica, lime or the like.

According to another embodiment of the invention the plastic material A is a pure, non-filled thermoplastic material selected from polyethylene, polypropylene, polybutene, polyamide, polycarbonate, polyalkyleneterephthalate, polyvinylchloride, polystyrene, cross-linked polyethylene or the like. The plastic material B is one of the above materials, preferably the same as the material A, mixed with 20–70% of an electrically conductive material selected from graphite nodules, carbon fibre, steel fibre or the like. The stratum formed by the plastic material B is connected to an electrical conductor so that a current flows through the stratum, whereby the stratum will work as a heating element. Hereby a pressure vessel provided with a heater can be achieved with a minimum of added parts.

The invention also relates to a pressure vessel for an improved water heater achieved through the process, wherein the pressure vessel includes two domes which forms the upper and the lower end of the pressure vessel and a circumfering shell which forms the sides of the vessel. The pressure vessel also contains a number of parting and load distributing walls, stretching from one dome to the other dome along the circumfering shell, wherein a number of cells are formed in the pressure vessel. The invention is characterised in that openings are placed in the area where the walls connect with the domes so that a communication is received between the cells. The thermal circulation that normally occurs is reduced by means of the walls, whereby a thermocline-like parting of the water with a warm upper zone and a cold lower zone is formed in the pressure vessel during the heating phase of cold water. The heating time for parts of the water is hereby radically reduced.

A great advantage with such a pressure vessel, parted into cells is also that it can be given shapes that diverges from the traditional spherical shape or cylindrical shape with spherical ends, without the need for unreasonable thick goods in the outer walls. A pressure vessel according to the invention can hereby be given a shape that matches the intended placing of the vessel by giving it a cross-section that is square, rectangular, rhomboid, L-shaped or the like.

At least one of the cells is suitably provided with at least one air- and water-tight bladder which contains a gas with a predetermined pressure. The pressure is adapted to the working pressure of the pressure vessel. A pressure/volume levelling function is hereby received which minimises the effects of thermal expansion of the water, sudden pressure shocks or the like. A rising pressure in the pressure vessel will compress the gas in the bladder so that its volume will be reduced since water cannot be compressed to any appreciable extent. The pressure in the water heater will hereby not increase as much for example in connection to heating of cold water. The increase in pressure will depend on the volume of the bladder related to the volume of the rest of the vessel. Another advantage by using such a bladder is that the effects of sudden pressure shocks in the water distribution system is reduced. It has, for example, occurred that household boilers burst from the sudden pressure shocks when water was re-introduced after repairs in the water supply system. This could have been avoided if such a bladder had been used in the pressure vessel. The bladder can also be provided with a valve which suitably is accessible from the outside of the vessel. The pressure in the bladder can hereby be adapted to the present pressure of the water supply system during the installation of the water heater.

The bladder is suitably manufactured from a rubber material such as natural rubber, synthetic rubber, a thermoplastic elastomer, or a somewhat elastic thermoplastic material such as polypropylene. To achieve a sufficient compressibility, when a thermoplastic material is used, the bladder can be given the design of a bellows. It is important to choose a material with good migration properties since the rised pressure and temperature otherwise will cause the bladder to be filled with water after some time of use.

According to one embodiment of the invention at least one of the cells is provided with openings only at the lower end of the pressure vessel, wherein a pressure levelling gas cavity is formed in the cell or the cells. A pressure/volume levelling function will hereby be received when the pressure in the vessel rises as the water in the vessel expands during heating. A rising pressure in the pressure vessel will compress the gas in the gas cavity so that its volume will be reduced since water cannot be compressed to any appreciable extent. The pressure in the water heater will hereby not increase as much for example in connection to heating of cold water. The increase in pressure will depend on the volume of the gas cavity related to the volume of the rest of the vessel. Another advantage by using such a gas cavity is that the effects of sudden pressure shocks in the water distribution system is reduced.

The pressure vessel is preferably manufactured of a thermosetting resin or a thermoplastic material. The thermosetting resin can be selected from polyester or melamine resin. When a thermoplastic material is preferred, a material is selected from polyethylene, polypropylene, polybutene, polyamide, polycarbonate, polyalkylenterephthalate, polyvinylchloride, polystyrene, cross-linked polyethylene or the like.

One advantage with a pressure vessel made from plastic material is that most plastic materials has a thermal coefficient of expansion larger than that of water. This will at least reduce, in some cases even reverse the pressure increasing effects caused by the thermal expansion of the water. The thermal conductivity of plastic materials are also by nature relatively poor, whereby the energy loss will be reduced when compared to a water heater made from metal. A pressure vessel made from plastic material will also be considerably lighter than its equivalence made of metal. This reduction of weight will be an advantage when installing a water heater. Another great benefit is that sacrificial anodes can be omitted since plastic materials do not corrode.

At least one of the crossing areas between intersecting walls is suitably provided with a through-hole channel which runs parallel to the walls. The channel constitutes the centre of the cross-section of the crossing area. The channel can be used for inlet or outlet of water. It will hereby be possible to make all the external connections to the vessel on a preferred side of the water heater which makes the placing of the heater easier.

Inlets and outlets in the form of tubes can of cause also be placed in separate holes the domes, which holes are separated from the walls and the crossing areas. These tubes can be attached after the injection moulding or be moulded in one piece with the vessel part.

The holes which are placed axially with the crossing areas in the gables are suitably provided with plugs selected from the group consisting of blind plugs, channel connection plugs connected to the channels, main connection plugs connected directly to the pressure vessel or closing plugs adapted to restriction or shut down of the flow through the communicating channels. The flow to and from the pressure vessel can hereby, as desired, be placed at the top or the bottom. The holes can be closed without closing the openings. It also becomes possible to close or restrict a part of an opening so that one ore more cells can be partly or fully separated from other cells, whereby it becomes possible to restrict the circulation in the vessel to a desired level.

The invention is further explained together with the enclosed drawings and an example which shows use of a pressure vessel for a water heater according to the invention compared to a conventional pressure vessel for a water heater.

Figure 1:
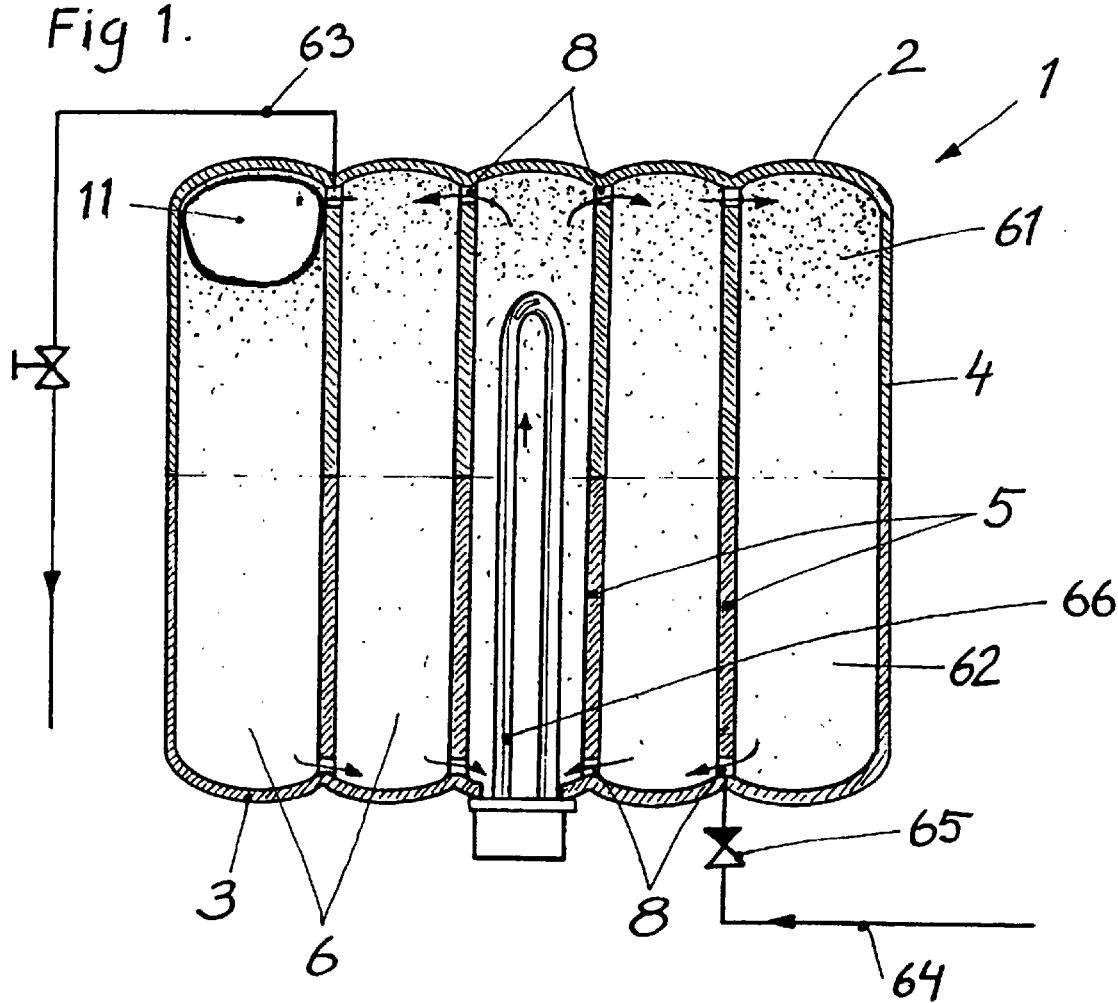
FIG. 1 shows schematically a cross-section of an embodiment of a water heater comprising a pressure vessel 1.

FIG. 1 shows schematically an embodiment of water heater comprising a pressure vessel 1. The pressure vessel 1 includes a top dome 2 and a bottom dome 3 and an circumfering shell 4. The pressure vessel 1 contains a number of parting walls 5 stretching from one dome to the other along the shell 4, whereby a number of cells 6 is formed in the pressure vessel 1. The walls 5 are provided with adapted openings 8 placed were the walls 5 are connected with the gables 2, 3.

A communication between the cells is hereby obtained. The thermally propelled circulation that normally occurs in a pressure vessel will be reduced by means of the walls 5, wherein a thermocline-like parting of the water with a warm upper zone 61 and a cold lower zone 62 will be formed during the heating of cold water. The heating time for parts of the water will hereby be reduced. A reduced amount of hot water can hereby be received before the total contained volume of water is heated to the desired temperature, by placing an outlet 63 in the top of the pressure vessel 1 where the hot water will accumulate. Cold water is supplied in the bottom of the pressure vessel 1 through an inlet 64 by a clack valve 65 which automatically opens when the pressure within the pressure vessel 1 falls under a predetermined level, which level is lower than the pressure of the water distribution system. The pressure vessel 1 is provided with a heater 66 which provides for the heating of the water. The heating of the water is achieved through convection where the surface of the heater 66 which is in contact with the water holds a temperature calculated as the temperature of the water plus 10 to 20° C. while the heater is on. The pressure vessel 1 is further provided with an air- and water-tight elastic bladder 11 placed in one of the cells 6 to reduce negative effects of sudden pressure shocks in the water distribution system as well as the expansion of water when heated. This bladder 11 has been filled with a gas at a pressure adapted to the normal working pressure of the water heater. Hereby a pressure/volume levelling function is achieved when the pressure in the vessel 1 is increased due to temperature related expansion of the water.

It is possible to adjust the dimensions of the openings 8 and power of the heater 66 whereby the intensity of the thermocline-like parting can be regulated so that the differences in temperature between the top and the bottom of the vessel can be increased and decreased respectively. The intensity of the thermocline-like parting is also depending of the thermal conductivity of the walls of the vessel. It is therefore possible to achieve greater differences in water temperature between top and bottom when the vessel is made of a plastic material since the thermal conductivity of plastic is low. The water in the cell 6 which contains the heater 66 will become sufficiently hot before the other cells 6 if the openings 8 are made sufficiently small. The outlet 63 is hereby suitably placed in connection to the cell 6 in which the heater 66 is located.

Figure 2:
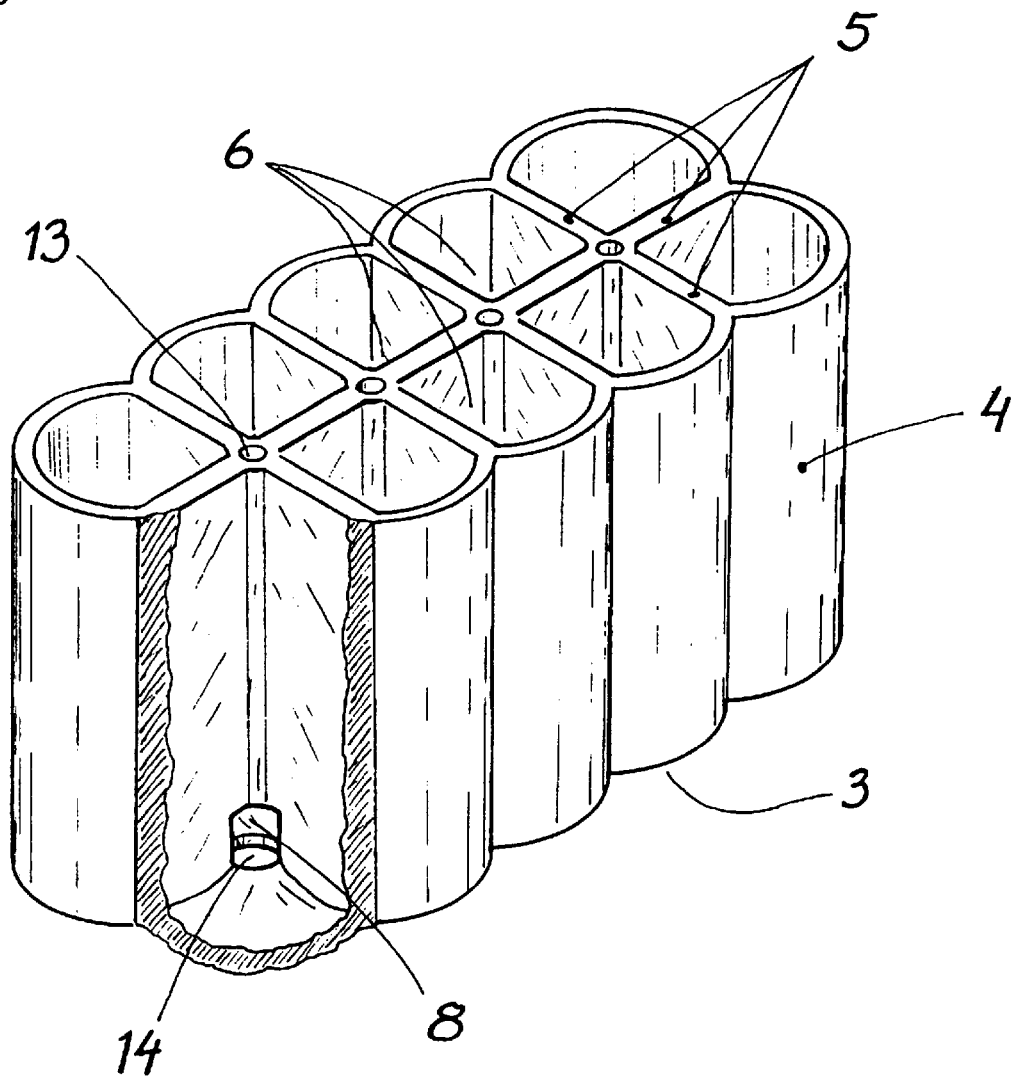
FIG. 2 shows in perspective an embodiment of one half of a pressure vessel 1 for a water heater.

FIG. 2 shows an embodiment of a lower vessel end part of a pressure vessel 1 for a water heater. The pressure vessel 1 comprises an upper vessel end part not shown which includes a dome 2 and a circumfering shell 4. The lower vessel end part comprises a dome 3 and a circumfering shell 4. The pressure vessel 1 contains a number of parting walls 5 wherein a number of cells 6 are formed in the pressure vessel 1. Matched openings 8 are placed between the different cells 6 at the point where the walls 5 join with the domes 2, 3. A communication between the cells 6 is hereby achieved. A number of crossing areas 7 (FIG. 3) are formed where the walls 5 intersect with each other. The crossing areas 7 are provided with a tube-like channel 13 which runs parallel to and the full length of the walls and which constitutes the centre of the cross-section of the crossing area 7 (FIG. 3).

Two such pressure vessel halves can be joined together in whereby a pressure vessel 1 is formed. A suitable method for joining such pressure vessel end parts manufactured from thermoplastic material is thermal or chemical confounding, e.g. welding.

Figure 3:
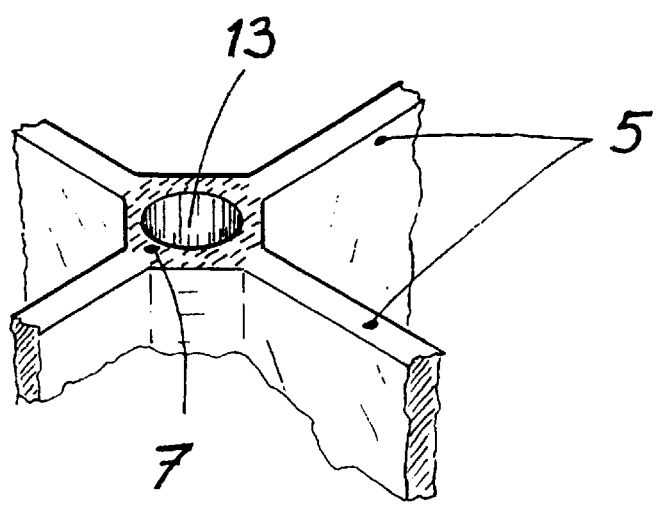
FIG. 3 shows, in perspective, parts of a crossing area between two intersecting walls.
Figures 4, 5:
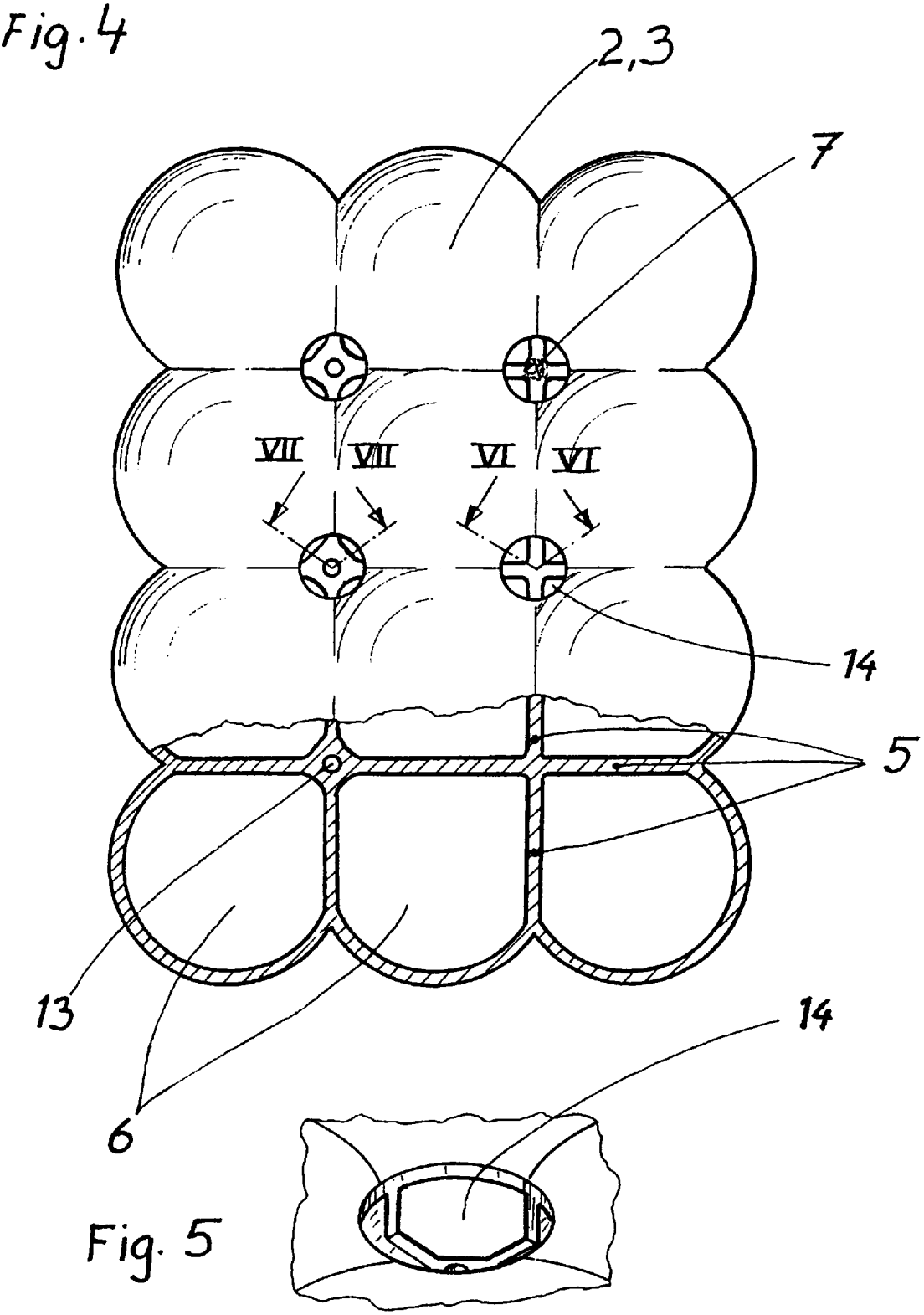
FIGS. 4–8 illustrate different processes at the manufacturing of a pressure vessel 1 according to the invention.

FIG. 3 shows a part of a crossing area 7 between two intersecting walls 5. A channel 13 is placed at the centre of the crossing area 7.

Figure 6:
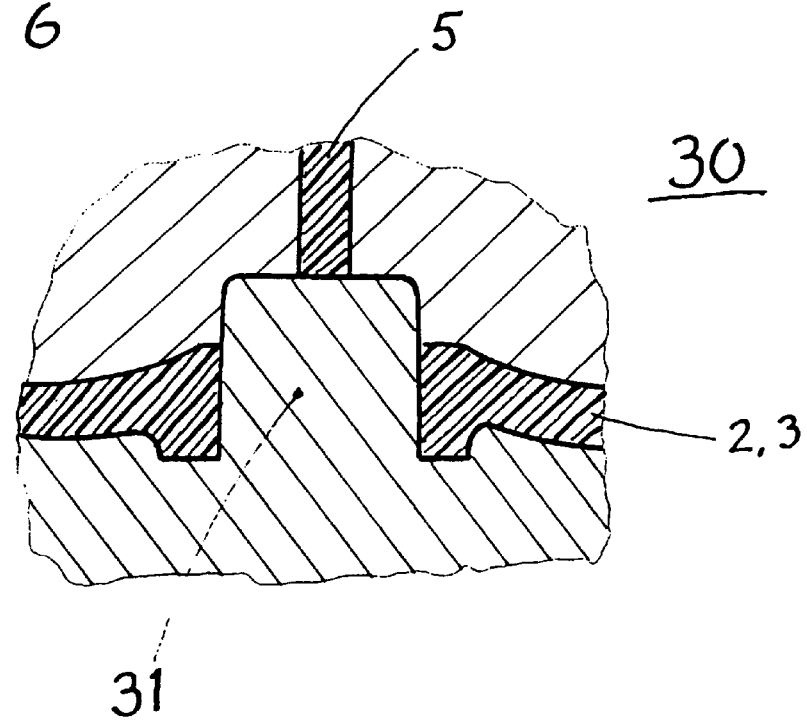
Figure 7:
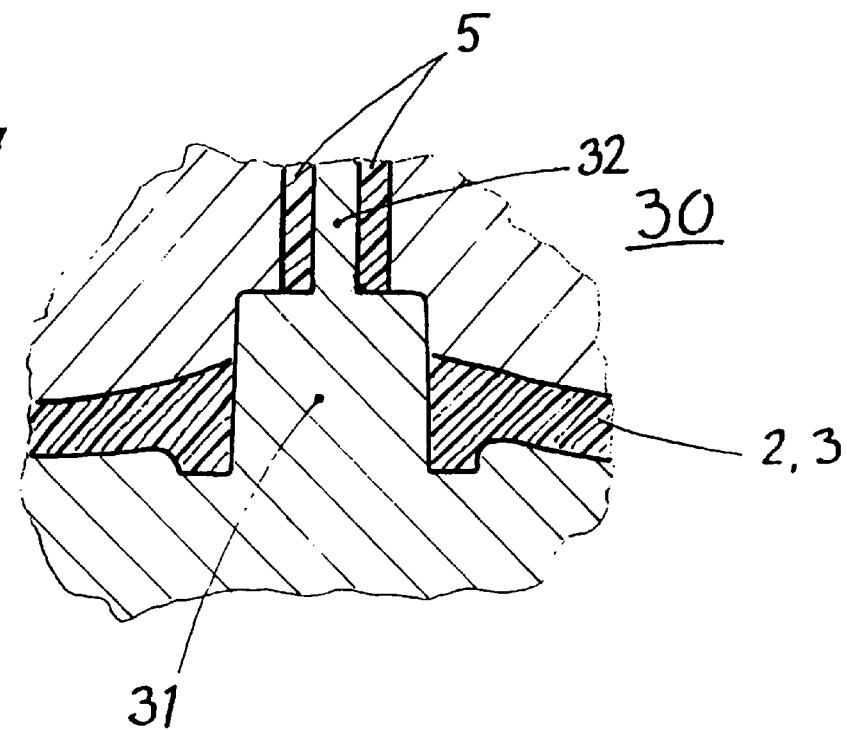
Figure 8:
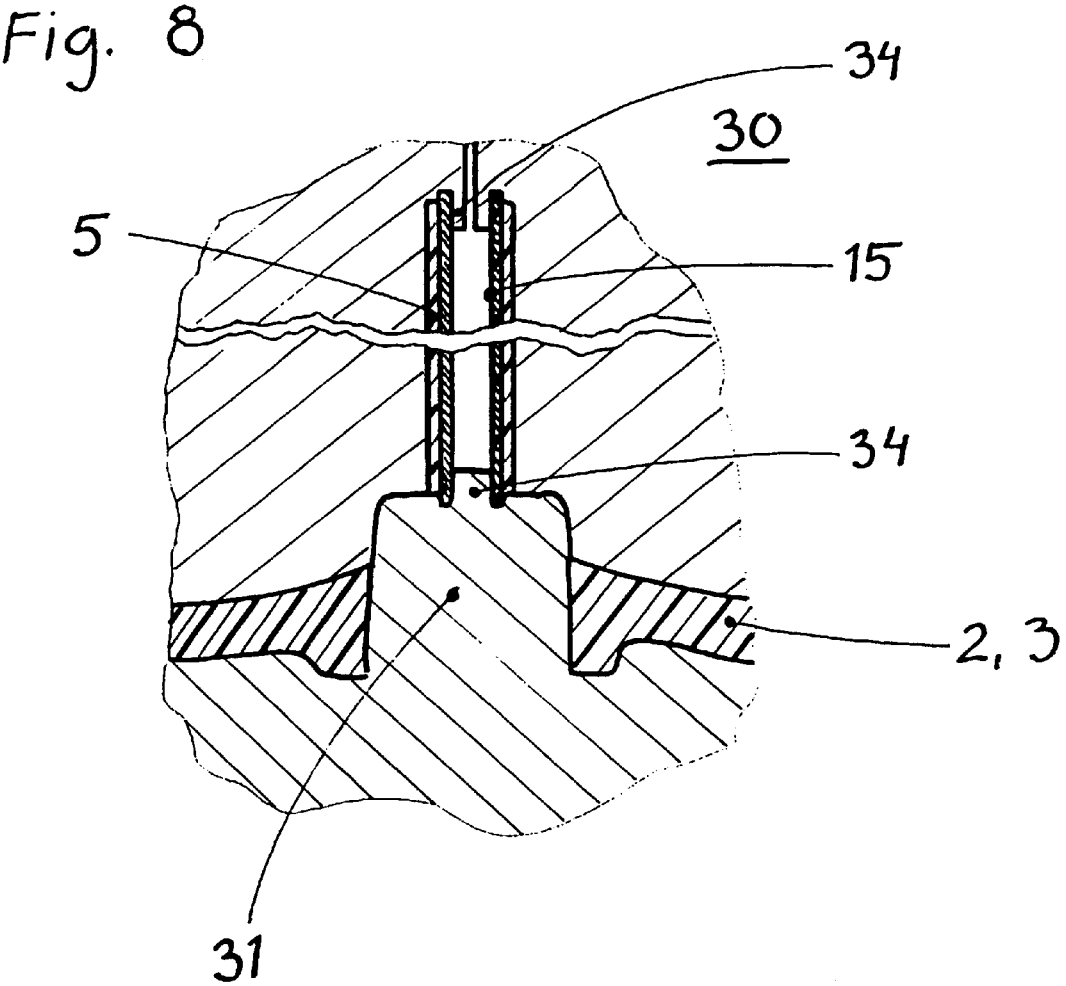
Figure 9:
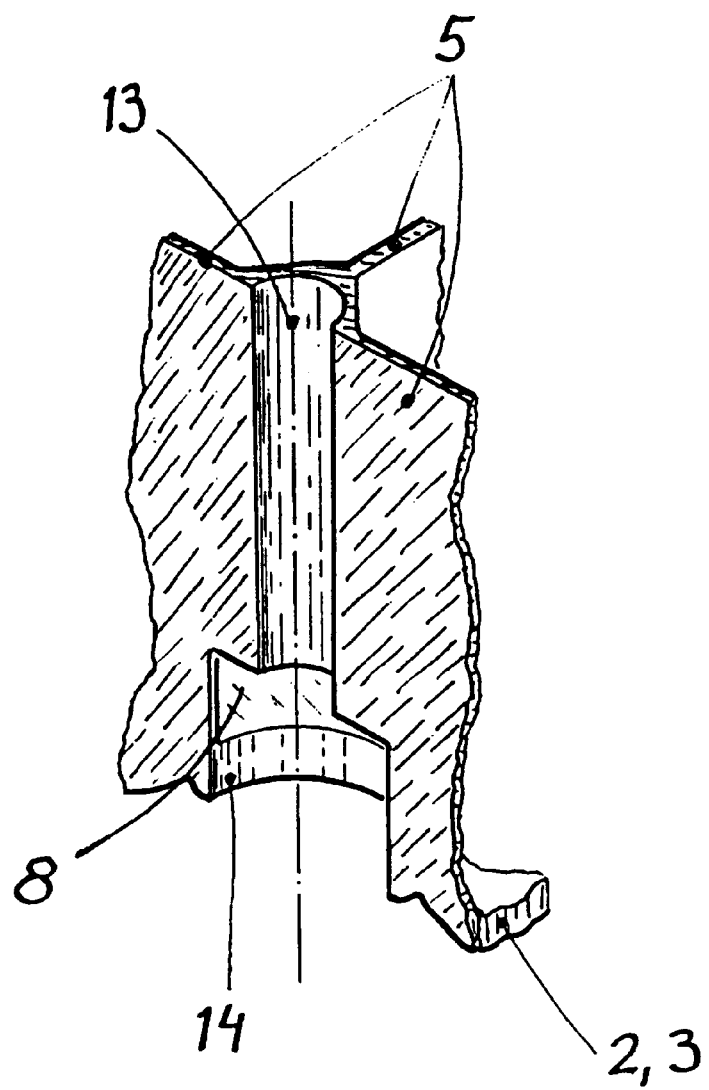
FIGS. 9–13 show, in perspective and in cross-section, a hole placed in a dome part and different plugs and processes for attaching the same.
Figure 10:
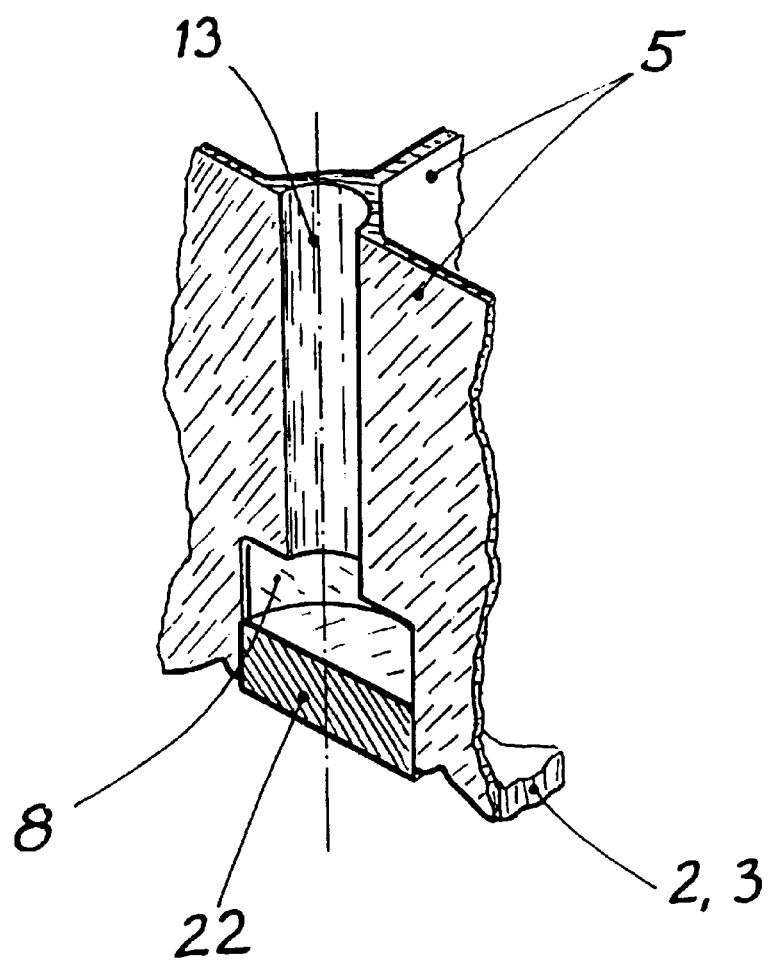

FIGS. 4–8 show different processes for the manufacturing of a pressure vessel 1. A, from a thermoplastic material manufactured, pressure vessel 1 comprises two vessel end parts and a number of interconnecting and thereby load distributing walls 5 between which a number of cells 5 are formed. The walls 5 are placed so that a number of crossing areas 7 are formed between intersecting or connecting walls 5. The crossing areas 7 are provided with a termination by means of peg-like parts 31 (FIG. 6) placed in one half of a mould 30 (FIG. 6). Holes 14 (FIGS. 4 and 5) with an area larger than the crossing area 7 and with a depth greater than the thickness of the walls in the domes 2, 3 are hereby formed from the outside of the vessel. A channel 13 (FIG. 4) which runs parallel to the walls 5 and the full length thereof will be achieved by placing long cores 32 (FIG. 7) at the peg-like parts 31 (FIG. 7) in the other half of the mould 30. The channel 13 is placed at the centre of the crossing area 7 and has an area smaller than the area of the crossing area 7.

According to an alternative embodiment it is possible to achieve channels 13 by providing the two halves of the mould 30 with receiving means 34 (FIG. 8) for an extruded tube 15. The receiving means 34 are placed axially with the peg-like parts 31. The tube 15 is placed in the mould 30 whereupon the plastic material can be injected into the mould 30 while the receiving means 34 and the edges of the tube 15 form a seal which prevents the plastic material from entering the inside of the tube 15.

The tube 15 can be prevented from collapsing under the pressure of the injected plastic by simultaneously introducing a pressurised gas on the inside of the tube 15. The pressure of the gas is mainly the same as the injection pressure of the plastic material.

Figure 11:
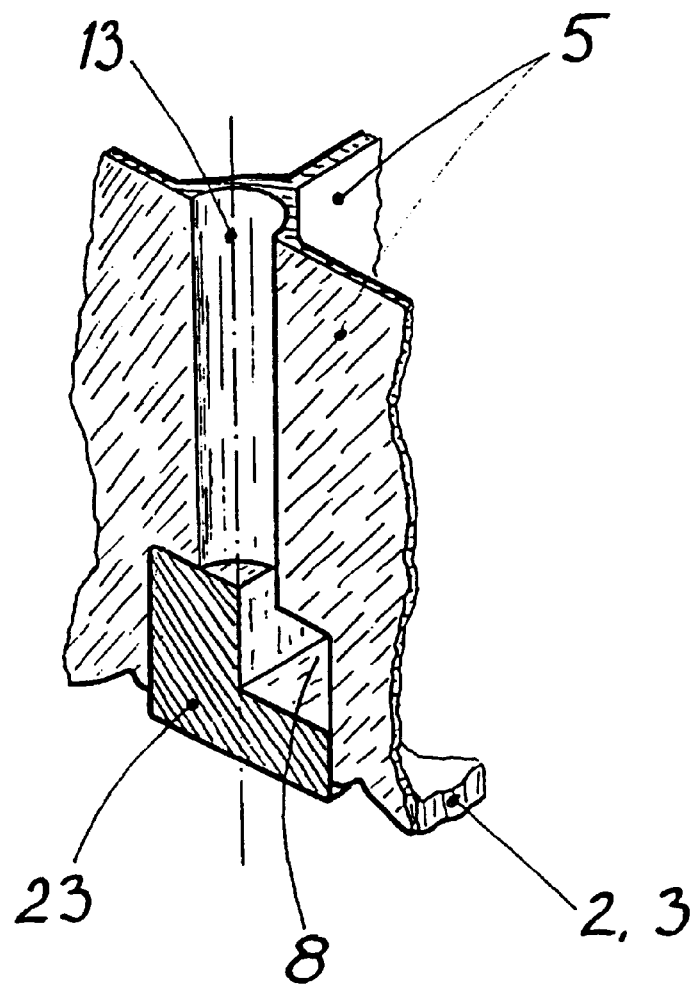
Figure 12:
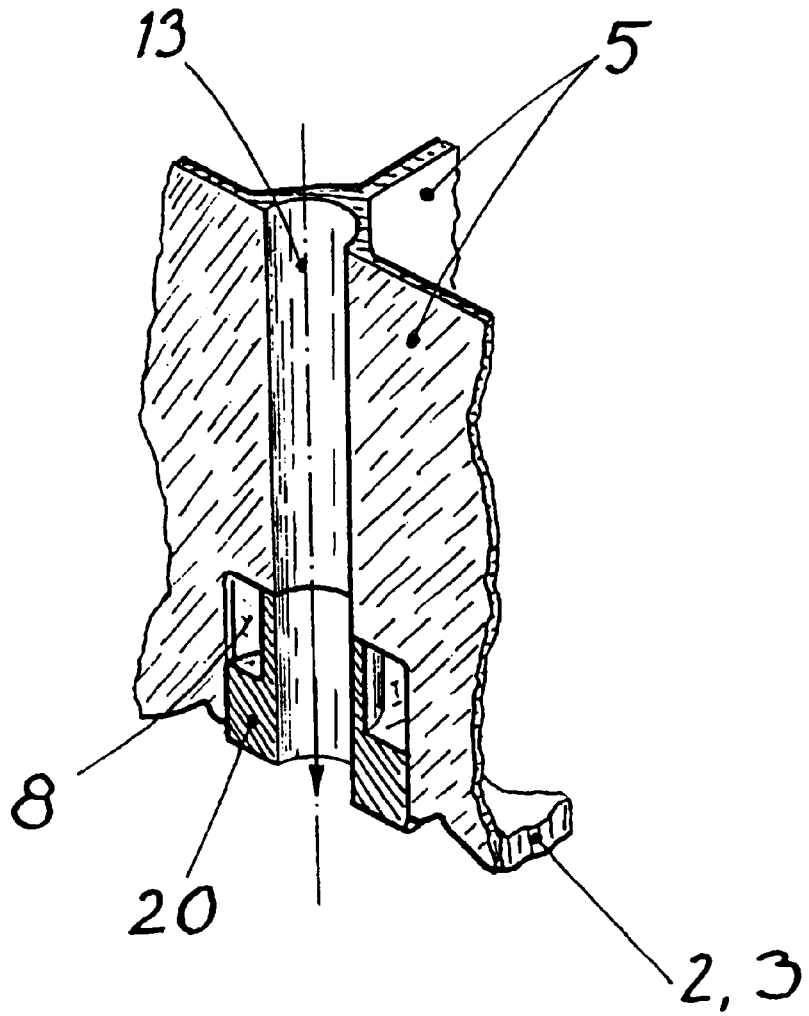
Figure 13:
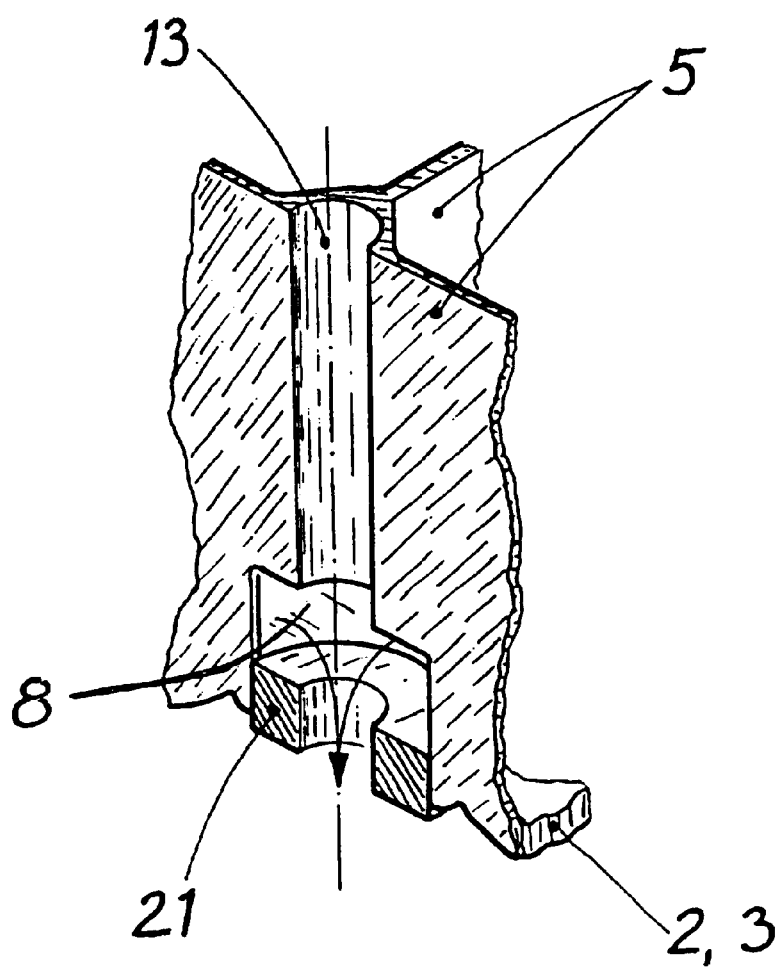

FIGS. 9–13 show in cross-section a hole 14 placed in at least one of the domes 2, 3, different plugs and different ways to attach the plugs. The holes 14 (FIG. 9) which are placed in the domes 2, 3, are provided with channel connection plugs 20 (FIG. 12) which connects to a channel 13, main connection plugs 21 (FIG. 12), blind plugs 22 (FIG. 10) or closing plugs 23 (FIG. 11). Inlet and outlet from the top or the bottom of the vessel can hereby be chosen regardless if the outer connections are placed at the top or the bottom of the pressure vessel 1. The holes 14 can further be closed without closing the openings 8, or a chosen part of an opening 8 can be closed so that one or more cells 6 (FIG. 2) are separated from each other. All plugs can advantageously be attached by means of a friction welding method where for example rotational friction welding is specially suitable, however ultra-sonic welding is preferred for the closing plug 23 since this is non-symmetrical.

Figure 14:
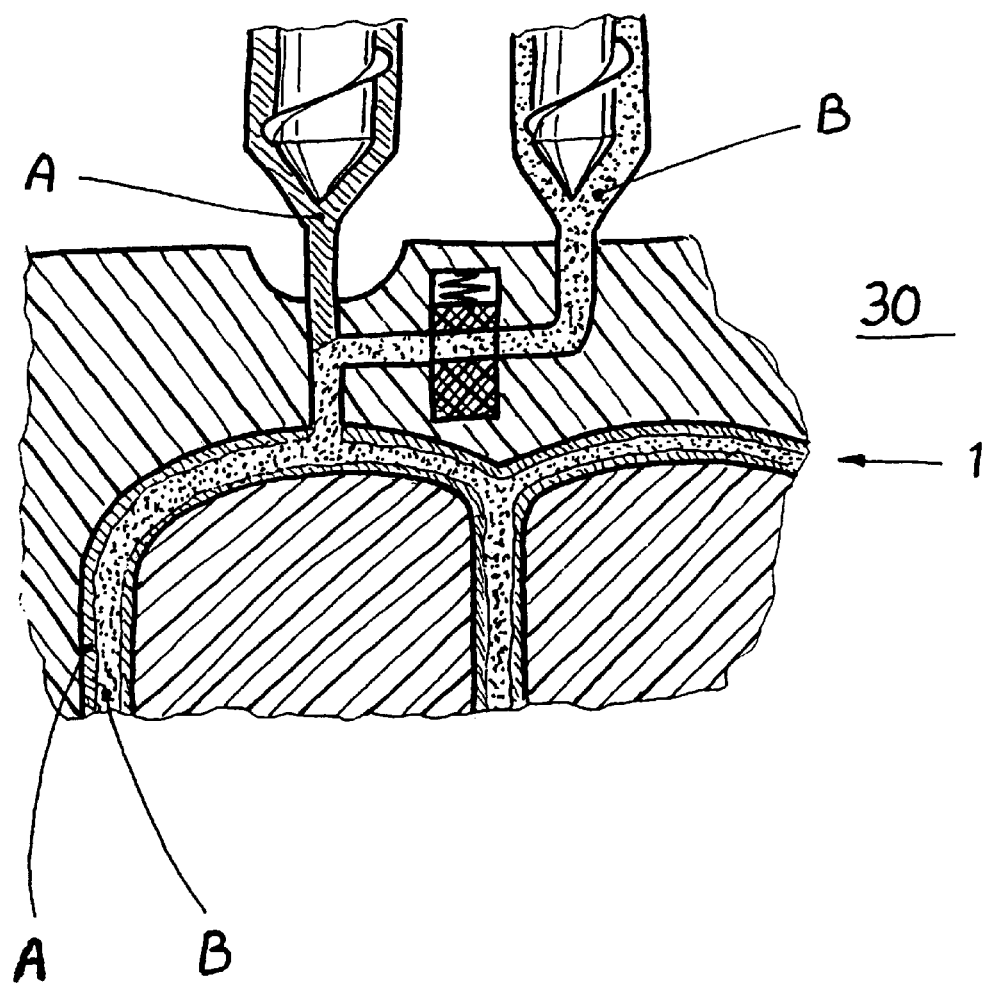
FIG. 14 shows, in cross-section, an embodiment of a process at the manufacturing of a pressure vessel comprising different thermoplastic compositions in an inner and outer stratum according to the invention.

FIG. 14 shows in cross-section a process for the manufacturing of a pressure vessel 1 from two thermoplastic compositions in an inner and outer strata. The pressure vessel 1 is manufactured by injection moulding with two different thermoplastic compositions by injecting a first predetermined amount of molten thermoplastic material A into the mould cavity of the mould 30. A remaining second amount of a thermoplastic material B is thereafter injected into the cavity so that the thermoplastic material A in the main will enclose the thermoplastic material B. The thermoplastic material A is constituted by a pure polybutene without any filling or reinforcing material while the thermoplastic material B is constituted by polybutene mixed with an reinforcing material in the form of 15% of carbon fibre.

According to an alternative embodiment of the invention the thermoplastic material B can be constituted by a thermoplastic material mixed with 20–70% of an electrically conductive material such as graphite nodules or conductive plastic material. The stratum constituted by the thermoplastic material B can hereby work as a heater by letting an electrical current flow through the material. The material will be self-adjusting since the thermal expansion in the thermoplastic part of stratum is relatively high. The resistance in the material will rise with increased temperatures since the graphite nodules will be parted from each other when the material expands. Needs of guiding electronics is hereby minimised or avoided. By increasing or decreasing the amount of filler added, a water heater adapted to a variety of different temperature ranges and voltage ranges can be achieved.

EXAMPLE

A first pressure vessel 1 according to the invention divided into 10 cells which were communicating by means of openings 8 according to FIG. 1 was compared to a second conventional pressure vessel without divisions. The two pressure vessels, which each could contain a volume of 20 liters, were each provided with one immersion heater of 3 kW. The immersion heater of the pressure vessel according to the invention were placed in the middle cell 6 in one of the rows according to FIG. 1. The pressure vessels were also provided with a first temperature sensor close to the centre of the top dome 2, a second one close to the point were the top dome 2 meets the circumfering shell 4, a third one close to the centre of the bottom dome 3 and finally a fourth one close to the point were the bottom dome 3 meets the circumfering shell 4. The heater were then turned on and the temperature sensors were read at even time intervals. The temperatures were after 20 minutes 65° C. and 64° C. respectively at the two upper sensors of the vessel according to the invention. The temperatures at the same points of the other vessel were 58° C. and 58° C. respectively. The temperatures at the bottom of the vessel according to the invention were 32° C. and 33° C. respectively while the temperatures in the other vessel were 40° C. and 41° C. respectively. The comparison shows that the pressure vessel according to the invention gave a considerably faster heating time of the water in the upper part of the vessel.

The invention is not limited by the embodiments shown since they can be varied within the scope of the invention. An extruded tube part, for example, can be provided with two injection moulded dome parts. The dome parts can for example be held in position by a tensional strapping-like arrangement. Pressure vessels with a great height can hereby be achieved. A vessel with such a height will of cause also show greater differences in temperature between the top and the bottom during the heating phase of cold water which is a desired quality.

What is claimed is:

1. A process for the manufacturing of a pressure vessel (1) made from a thermoplastic material or a thermosetting resin, which pressure vessel (1) comprises a first and a second vessel end part manufactured through injection moulding or press moulding and possibly an intermediate tube part which preferably is manufactured through extrusion, wherein the vessel end parts include a circumfering shell (4) which forms the sides of the pressure vessel (1) and each one dome (2 or 3) which form the upper and lower ends respectively of the pressure vessel (1) when joined, wherein a number of interconnecting and thereby load distributing walls (5) stretch from the domes (2, 3) along the circumfering shell (4) towards the open part of each vessel end part, wherein a corresponding number of matching walls (5) are stretching from one open end of the possible intermediate tube part along the circumfering shell of the tube part to the other end of the same so that when two vessel end parts are joined, possibly with an intermediate tube part placed in between, the edges of each of the walls (5) in the different parts meet, between which walls (5) a number of cells (6) are formed, and wherein the walls (5) are placed so that a number of crossing areas (7) are formed between intersecting or connecting walls (5), characterised in that at least one preferably all crossing areas (7) are provided with a termination by achieving a hole (14) from the outside of the dome, which hole (14) is bigger than the crossing area (7) and has a depth greater than the goods thickness of the dome part (2, 3) wherein communicating openings (8) between the cells (6) in the pressure vessel (1) are prepared.

2. A process according to claim 1 wherein the vessel end parts and the possible intermediate tube part are joined by mirror welding, friction welding, pressing or gluing.

3. A process according to claim 1 wherein the holes (14) are manufactured by means of peg-like parts (31) placed in one of the halves of a mould (30).

4. A process according to claim 3 wherein one or more of the peg-like parts (31) which is/are placed in one of the mould halves and/or opposite point/points at the other half of the mould is/are provided with an axially placed long core or cores (32) whose cross-section area is/are smaller than the crossing area (7), whereby at least one channel (13) which is parallel to the walls (5) are formed in the cross-section of the crossing area (7).

5. A process according to claim 3 characterised in that the two halves of the mould (30) are provided with receiving means (34), placed axially with the peg-like parts (31), which receiving means (34) are intended to receive a preferably extruded tube (15) which tube is manufactured from a thermosetting resin or a thermoplastic material, that the tube (15) is placed in the mould cavity of the mould (30) after which a fluent plastic material is injected into the mould cavity while the receiving means (34) prevents intrusion of plastic material into the tube through a tight fit between the receiving means (34) and the edges of the tube (15).

6. A process according to claim 5 wherein a gas is injected into the tube (15) simultaneously with the injection of the plastic material so that a pressure mainly corresponding to the pressure of the injected fluent plastic material forms within the tube (15), wherein the tube is prevented from collapsing under influence of the injection pressure of the plastic material.

7. A process according to claim 3 characterised in that the two halves of the mould (30) are provided with receiving means (34), placed axially with the peg-like parts (31), which receiving means (34) are intended to receive a melt core profile which is placed into the mould (30) after which fluent plastic material is injected into the mould cavity, and that the melt core profile is removed by melting after allowing the plastic material to solidify and removal of the part from the mould, whereby at least one channel which is parallel to the walls (5) is formed in the cross-section of the crossing area (7).

8. A process according to claim 3 characterised in that predetermined amount of fluent plastic material is injected into the mould cavity, which plastic material is allowed to solidify somewhat, after which a gas is injected into the plastic material through the peg-like parts (31) or the opposite points in the other half of the mould (30), whereby at least one channel (13) which is parallel to the walls is formed in the cross section of the crossing area (7).

9. A process according to claim 1 wherein the holes (14) are provided with plugs selected from the group consisting of a blind plug (22), a channel connection plug (20) connected to the channels (13), a main connection plug (21) connected directly to the pressure vessel (1) or a closing plug (23) adapted to restriction or shut down of the flow in the communicating openings (8), which plugs are glued, screwed, friction welded, mirror welded or pressed into the holes (14) of the domes (2, 3).

10. A process according to claim 1 wherein the two vessel end parts and the possible intermediate tube part are manufactured through injection moulding of two, preferably thermoplastic, compositions by injecting a first predetermined amount of a fluent plastic material A into the mould cavity after which a second remaining amount of a fluent plastic material B is injected so that the plastic material A in the main will enclose the plastic material B.

11. A process according to claim 10 wherein the plastic material A is a pure, not filled thermoplastic material selected from polyethylene, polypropylene, polybutene, polyamide, polycarbonate, polyalkyleneterephthalate, polyvinylchloride, polystyrene, cross-linked polyethylene or the like, and that the plastic material B is one of the above materials, preferably the same as the material A, mixed with 1–35% of a material selected from glass fibre, carbon fibre, steel fibre, mica, lime or the like.

12. A process according to claim 10 wherein the plastic material A is a pure, not filled thermoplastic material selected from polyethylene, polypropylene, polybutene, polyamide, polycarbonate, polyalkyleneterephthalate, polyvinylchloride, polystyrene, cross-linked polyethylene or the like, and that the plastic material B is one of the above materials, preferably the same as the material A, mixed with 20–70% of an electrically conductive material selected from graphite nodules, carbon fibre, steel fibre or the like, and that the stratum formed by the plastic material B is connected to an electrical conductor so that a current flows through the stratum, whereby the stratum will work as a heating element.

13. Pressure vessel (1) made by a process according to claim 1, especially a pressure vessel (1) for a water heater, which pressure vessel (1) includes two domes (2, 3) which forms the upper and the lower end of the pressure vessel (1) and a circumfering shell (4) which forms the sides of the pressure vessel (1), and which pressure vessel (1) further contains a number of parting and load distributing walls (5) stretching from one dome (2) to the other dome (3) along the circumfering shell (4) wherein a number of cells (6) are formed in the pressure vessel (1), characterised in that openings (8) are placed in the area where the walls (5) connect with the domes (2, 3) so that a communication is received between the cells (6), that the thermal circulation that normally occurs is reduced by means of the walls (5), whereby a thermocline-like parting of the water with a warm upper zone (61) and a cold lower zone (62) is formed in the pressure vessel (1) during the heating phase of cold water, wherein the heating time for parts of the water is radically reduced.

14. Pressure vessel (1) according to claim 13 wherein at least one of the cells (6) is provided with at least one air- and water-tight bladder (11) which contains a gas with a predetermined pressure, which pressure is adapted to the working pressure of the pressure vessel (1), wherein a pressure/volume levelling function is received which minimises the effects of thermal expansion of the water, pressure shocks or the like.

15. Pressure vessel (1) according to claim 13 wherein at least one of the cells (6) is provided with openings (8) only at the lower end of the pressure vessel (1), wherein a pressure levelling gas cavity is formed in the cell or the cells (6).

16. Pressure vessel (1) according to claim 13 wherein the pressure vessel (1) is manufactured from a thermosetting resin selected from the group polyester or melamine resin or a thermoplastic material selected from the group polyethylene, polypropylene, polybutene, polyamide, polycarbonate, polyalkyleneterephthalate, polyvinylchloride, polystyrene, cross-linked polyethylene or the like.

17. Pressure vessel (1) according to claim 13 wherein at least one of the crossing areas (7) between the intersecting walls (5) is provided with a channel (13) which runs parallel to and the full length of the walls (5).

18. Pressure vessel (1) according to claim 13 wherein holes (14) placed in the domes (2, 3) are provided with plugs selected from the group consisting of blind plugs (22), channel connection plugs (20) connected to the channels (13), main connection plugs (21) connected directly to the pressure vessel (1) or closing plugs (23) adapted to restriction or shut down of the flow through the communicating openings (8), whereby the flow to and from the pressure vessel (1) by choice can be placed at the top or the bottom, that the holes (14) can be closed without closing the openings (8) or that a part of an opening (8) can be closed or restricted so that one ore more cells (6) can be partly or fully separated from each other.

* * * * *